United States Patent [19]

Naka et al.

[11] Patent Number: 5,648,820
[45] Date of Patent: Jul. 15, 1997

[54] TIME-BASE CONVERSION SYSTEM

[75] Inventors: Hideyuki Naka; Kazuo Konishi; Kazuyuki Ooishi, all of Kanagawa-ken, Japan

[73] Assignee: Kabushiki Kaisha Toshiba, Kawasaki, Japan

[21] Appl. No.: 427,959

[22] Filed: Apr. 26, 1995

[30] Foreign Application Priority Data

Apr. 27, 1994 [JP] Japan .................................. 6-089825

[51] Int. Cl.$^6$ .................................................. H04N 7/01
[52] U.S. Cl. ............................................ 348/445; 348/618
[58] Field of Search .................................. 348/445, 448, 348/458, 459, 441, 443, 497, 554–558, 567, 568, 714, 716, 619; H04N 7/01

[56] References Cited

U.S. PATENT DOCUMENTS

| | | |
|---|---|---|
| 4,597,019 | 6/1986 | Nishimoto et al. . |
| 4,651,208 | 3/1987 | Rhodes et al. . |
| 4,691,248 | 9/1987 | Nishimoto . |
| 4,785,348 | 11/1988 | Fonsalas et al. . |
| 4,922,118 | 5/1990 | Maeshima ..................... 348/458 |
| 4,972,335 | 11/1990 | Furuhata et al. . |
| 5,170,256 | 12/1992 | Tabata . |
| 5,227,882 | 7/1993 | Kato ............................. 348/718 |
| 5,231,490 | 7/1993 | Park ............................. 348/704 |
| 5,323,235 | 6/1994 | Tonomura et al. ............. 348/445 |
| 5,349,385 | 9/1994 | Glenn ........................... 348/445 |

FOREIGN PATENT DOCUMENTS

| | | |
|---|---|---|
| 0414311 | 2/1991 | European Pat. Off. . |
| 0545341 | 6/1993 | European Pat. Off. . |
| 0553767 | 8/1993 | European Pat. Off. . |
| 2606576 | 5/1988 | France . |
| 62-501951 | 7/1987 | Japan . |
| WO86/05644 | 9/1986 | WIPO . |

OTHER PUBLICATIONS

Katsumata et al., "Development of Picture Converting System Applying an NTSC Signal to a Wide Aspect Display", IEEE Transaction on Consumer Electronics, vol. 38, No.3, pp. 303–311.

Primary Examiner—Michael Lee
Attorney, Agent, or Firm—Cushman, Darby & Cushman IP Group of Pillsbury Madison & Sutro LLP

[57] ABSTRACT

A time-base conversion system including a first clock generator for generating a read clock based on a reference signal, a second clock generator for generating a write clock by dividing the read clock, a memory, a circuit for writing video data in the memory based on the write clock, a circuit for reading the video data recorded in the memory based on the read clock, and a time-base compressor for determining a compression ratio of the video data time-base by determining a division ratio of the write clock.

8 Claims, 15 Drawing Sheets

TIME-BASE CONVERSION SYSTEM

FIELD OF THE INVENTION

The present invention relates generally to a time-base conversion system suitable for use in television receivers, information communication equipment and the like, and more particularly to a time-base converter such as a time-base compressor, a time-base expander and the like and applications therefor.

BACKGROUND OF THE INVENTION

FIG. 19 shows an example of a time-base compressor in conventional time-base conversion systems. As means for compressing the time-base of input and output signals, this example of the time-base compressor is constructed to conduct a thinning operation of signal data to be written into a memory by a digital filter and by reading the signal. In the time-base compressor of this structure, a compression ratio of the time-base is determined by a thinning ratio for thinning data to be written into a memory.

The input analog signals are converter into digital signals having a prescribed sampling period based on the clock frequency by an AD converter 191. The clock signal is generated as a clock having a prescribed period by a clock signal generator 192. The converted digital signal data are thinned out by a digital filter 193 on the time-base in order to determine a required compression ratio, for instance, to compress the data to ¾ times. An FIR type filter is often used for this digital filter 193. For the thinning operation, it is necessary to properly determine tap coefficients in order to take three signal data out of four different signal data continuous on the time-base. Examples of the tap coefficients are shown in FIG. 20.

The signal data thinned out on the time-base are written into a memory 194. The written signal data are read out in the same period as a prescribed sampling period according to the clock frequency of the clock generator 192 and the read digital signal data are converted into analog signals by an AD converter 195. The converted analog signals become to a compressed data that the input analog signal are compressed on a ¾ times time-base. Thus, the time-base is compressed.

In such a time-base compressor, the digital filter 193 is used for thinning the time-base to compress the time-base. Generally, a filter comprising a digital circuit has an increased size and complicated circuit arrangement. It therefore often causes a bottleneck in the system. Further, when making a circuit scale small, it becomes difficult to achieve a desired performance.

In case of such a conventional time-base conversion system, filters such as FIR type filters are used for the time-base thinning operation and there is a problem that a circuit scale becomes large and the circuit arrangement is complicated. If tried to make a circuit scale small in this construction, it is difficult to achieve a desired performance.

FIG. 21 shows another example of conventional time-base compressors for solving the problems as described above. This is a time-base compressor constructed to achieve the time-base compression by making the memory write clock frequency and read clock frequency different from each other by means of compressing time-bases of input and output signals.

In the time-base compressor having the above construction, a read clock is generated by multiplying a write clock, and a time-base compression ratio is fixed by determining a multiplication ratio.

Input analog signals are converted into digital signals having a prescribed sampling period based on the write clock frequency. This write clock is generated as a clock having a prescribed period by a clock generator 212. The converted digital signals are written into a memory 213 based on the write clock.

On the other hand, a read clock is generated by multiplying the write clock generated in the clock generator 212 by a multiplier 214 with a 4/3 times multiplication ratio. This multiplying operation is performed by using, for instance, a PLL. The signal data written into the memory by the write clock are read based on the read clock. The read digital signal data are converted into analog signals by a DA converter 215. The converted output analog signals are turned to data that are obtained by compressing input analog signals on the ¾ times time-base through the signal processing described above. The time-base compression can be thus performed.

In this time-base compressor, a digital filter is not required to perform the time-base compression for the time-base thinning. Therefore, the circuit construction is made simple and it becomes more easy to achieve a system than the conventional apparatus described above. However, as the time-base is compressed corresponding to a multiplication ratio of the write clock based on the write clock to the memory 213, there is such a problem that the read clock frequency increases by a multiple of the compression ratio. That is, because the read clock will be increased corresponding to a compression ratio, the access speed to the memory 213 or the operating speed of the AD converter 215 excedes its upper limit when the compression ratio increases. As a result, it becomes difficult to achieve the time-base conversion system.

As described above, in a conventional time-base compressor, the problem involved in the time-base compressor explained in FIG. 19 can be settled. However, there is another problem that it becomes difficult to achieve a time-base compressor if a large compression ratio is used because the time-base compression is made by varying a read clock based on the read clock to a memory. Consequently a read clock frequency is increased too high and the upper limit of a memory access speed or that of the operating speed of a DA converter exceeds its operable limit.

In addition, the conventional time-base conversion system has such a problem that one clock jitter occurs between the write clock and the read clock, and a reproduced video picture with a satisfactory quality cannot be obtained in a system where read and write clock frequencies are different each other.

As described above, in a conventional time-base conversion system, there were such problems that use of a time-base thinning filter renders the circuit scale large and complicated, making it hard to get a desired performance, if the circuit scale is reduced. In a time-base conversion system without using a filter, it becomes difficult to achieve a system when the read clock frequency is increased higher if a compression ratio is made large because the time-base is compressed by changing the read clock based on the write clock. Also, one clock jitter occurs between the write and the read clocks if they are different in frequency with each other, preventing reproduction of a video picture with a satisfactory quality.

SUMMARY OF THE INVENTION

It is an object of the present invention to provide a time-base conversion system that is capable of obtaining satisfactory video without generating one clock jitter even when the read clock frequency and the write clock frequency are different with each other.

In order to achieve the above object, a time-base conversion system according to one aspect of the present invention is characterized in that the write clock is generated by dividing or multiplying the read clock based on, for instance, the read clock, and a compression ratio or an expansion ratio of a time-base is determined by determining a frequency dividing ratio.

The system which generates a read clock and a write clock based on a horizontal synch. signal and converts a wide aspect ratio by keeping the read clock frequency constant and varying the write clock frequency, and applying a filter selecting signal corresponding to a compression ratio, selects a filter of the optimum frequency band for the system corresponding to the change in the write sampling frequency.

The VCO (Voltage Control Oscillator) system in which a write clock generating VCO operates based on a clock generated by a read clock generating VCO and a read timing generating counter which is operated by a read clock a write timing generating counter which is operated by a write clock are cleared by a clear signal generated by the read clock or the write clock at every line (for instance, 1824 times period of a read clock period) because of a difference between the read clock frequency and the write clock frequency.

A frequency divider which converts the VCO output for generating a write clock to a signal for phase comparison with a read clock is provided with a control signal input that is externally controllable and its frequency division is variable as desired by an external control signal supplied from the outside.

By constructing the system as described above, the time-base is converted by changing a write clock based on a read clock of a memory, the circuit scale can be made small and even when a compression ratio is made large, a read clock frequency is kept constant and a large compression ratio can be easily achieved.

If a write frequency is high, a wide frequency band filter is selected and if it is low, a narrow frequency band filter is selected for preventing the aliasing error and as the optimum filter is selected corresponding to a compression ratio, reproduced video in high quality of picture can be always obtained.

By determining 0 address of a counter for every line, one clock jitter between a read clock and a write clock can be eliminated and the satisfactory conversion operation can be achieved when used in the aspect conversion, etc.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
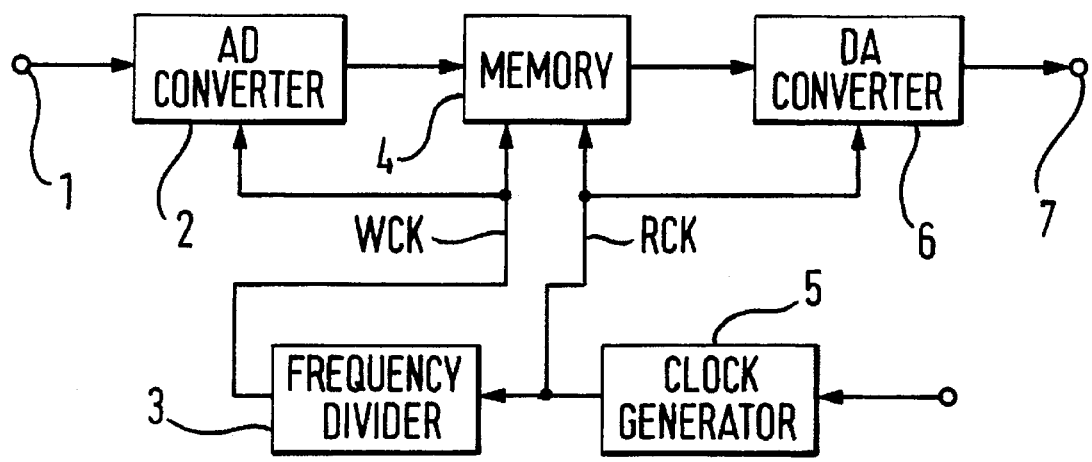
FIG. 1 is a circuit diagram for explaining one embodiment of the present invention.

Referring now to FIGS. 1 through 5, a first embodiment of the time-base conversion system according to the present invention will be described in detail. FIG. 1 illustrates a system for explaining one embodiment of the present invention. As means for compressing a time-base of input and output signals, this is a time-base compressor constructed to perform a time-base compression by making the write clock frequency and the read clock frequency to and from a memory different with each other. In the time-base compressor, a write clock is generated by dividing a read clock and a compression ratio of the time-base is determined by determining a frequency dividing ratio based on the read clock.

An analog signals input to an input terminal 1 is converted into a digital signal with a prescribed sampling period by an AD converter 2 based on a write clock frequency. This write clock is generated by dividing a read clock in a frequency divider 3 at a prescribed frequency division ratio, for instance, by a ¾ times frequency divider. This frequency division is performed using, for instance, a programmable frequency divider. The converter digital signals are written into a memory 4 based on the write clock.

On the other hand, a read clock is generated by a clock generator 5. The signal data written into a memory based on a write clock are read based on the read clock, and the read digital signal data are converted into analog signals by a DA converter 8. The converted output analog signals are led out from an output terminal 7 as the input analog signal data compressed on a ¾ times time-base. The time-base compression can be achieved in the process described above.

In this embodiment, a digital filter for thinning a time-base for the time-base compression is not used. Therefore, the circuit configuration becomes simple and it is easy to achieve the circuit as the time-base conversion system. Furthermore, as the time-base is compressed by dividing a read clock at a frequency dividing ratio determined based on a read clock of the memory 4, this circuit has a feature that the write clock frequency is lowered by a multiple of compression ratio. Thus, even when a large compression ratio is used, a read clock is not increased higher in proportion to the compression ratio but a write clock is rather lowered, and therefore it is easy to achieve this system without being subject to restriction by an access speed to the memory 4 and the operating speed of the DA converter 8.

Figure 2:
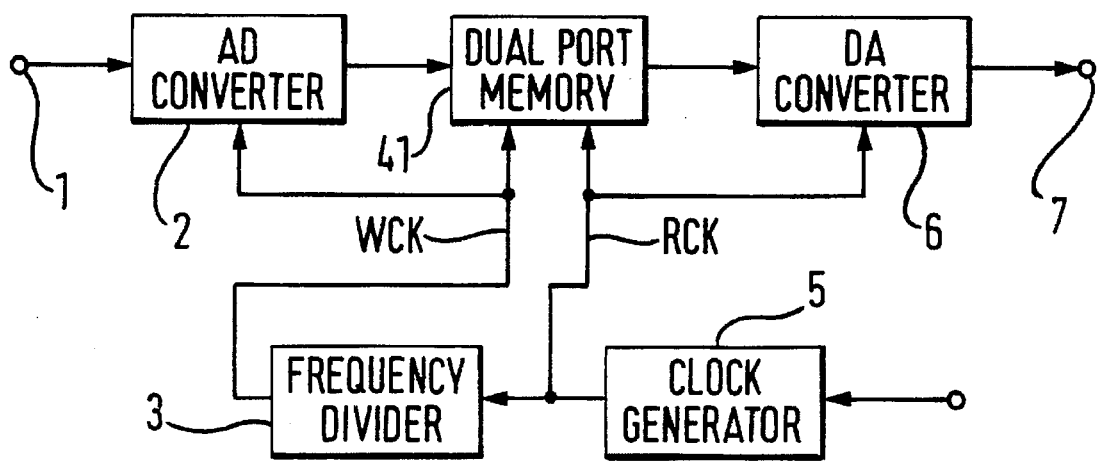
FIG. 2 is a system diagram for explaining a first embodiment of the present invention.

FIG. 2 is a diagram showing the circuit construction. The time-base compressor of this embodiment is constructed to perform the time-base compression by making the memory write clock frequency different from the read clock frequency by means of compressing the time-base of input and output signals. This embodiment differs from the embodiment shown in FIG. 1 in that a dual port memory 41 is used.

In the time-base compressor with the above construction, a write clock is generated by dividing a read clock, and a time-base compression ratio is determined by determining a frequency dividing ratio based on the read clock.

Input analog signals are converted into digital signals having a prescribed sampling period corresponding to the write clock frequency by the AD converter 2. This write clock is generated as a clock by dividing a read clock in a frequency dividing circuit 3 at a prescribed dividing ratio, for instance, ¾ times division.

Figure 3:
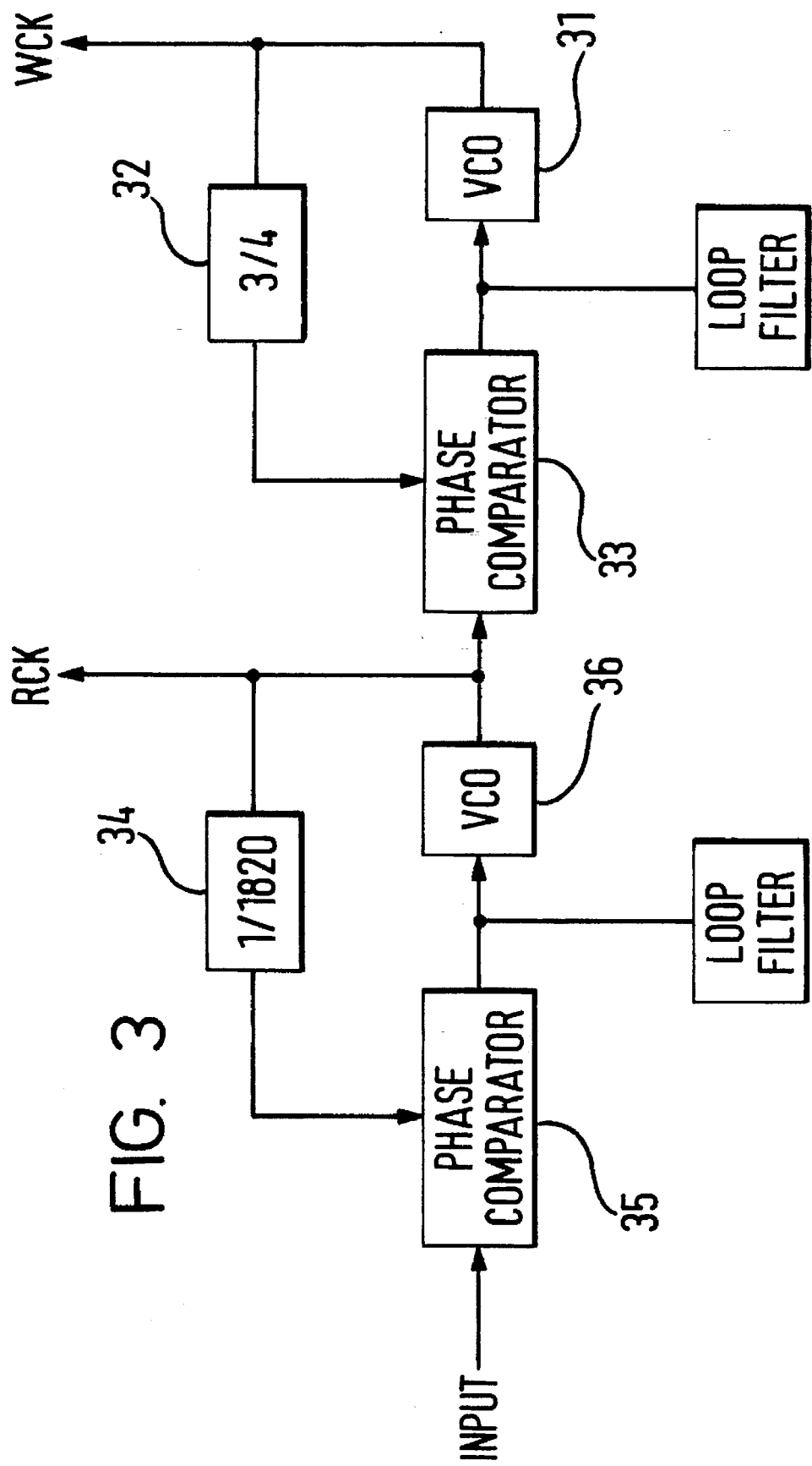
FIG. 3 is a circuit diagram showing a PLL circuit that is used for achieving the embodiment of the present invention.
Figure 4:
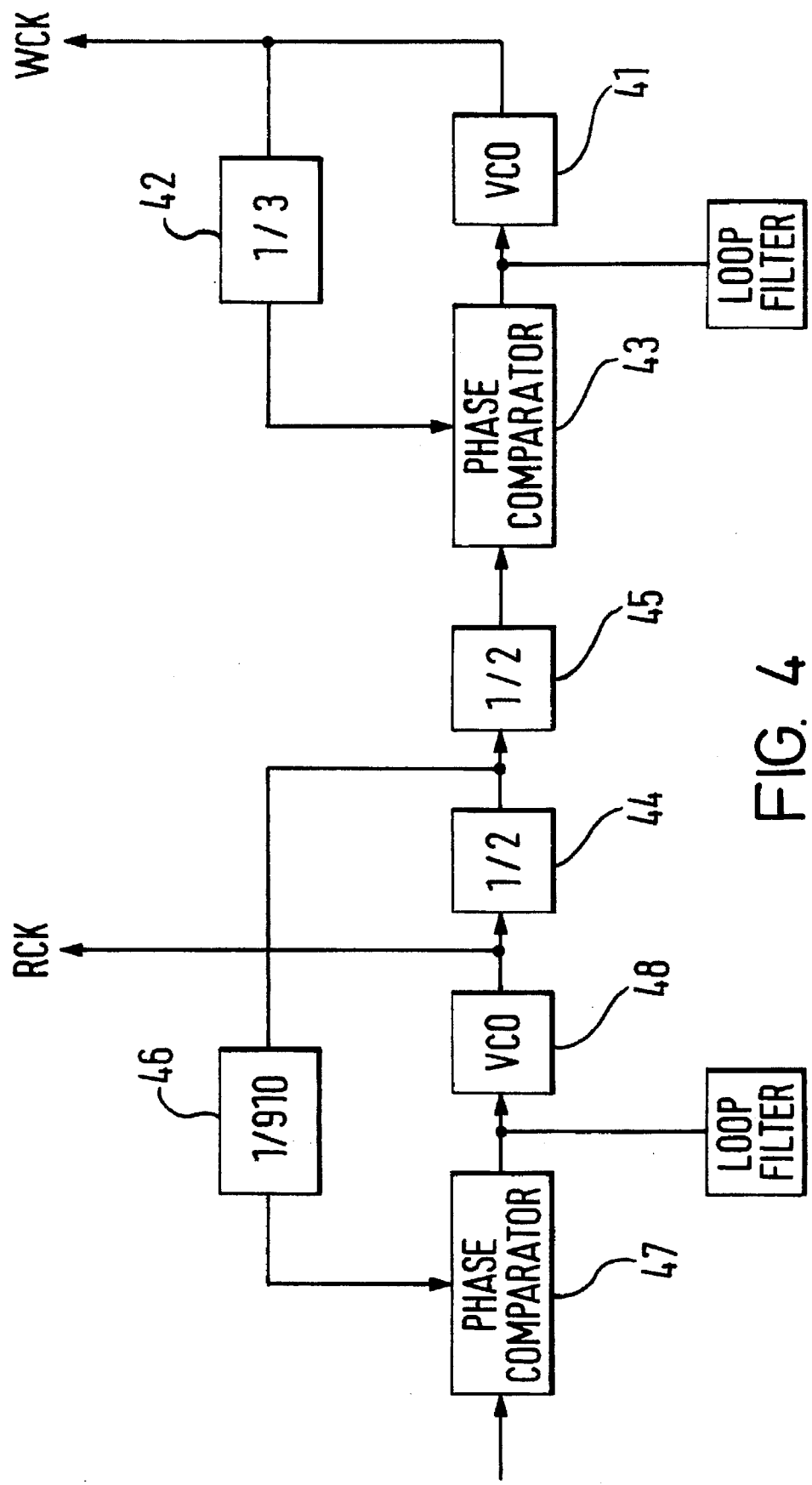
FIG. 4 is a circuit diagram showing another PLL circuit that is used for achieving the embodiment of the present invention.

FIGS. 3 and 4 are both for explaining the definite circuit diagrams of the frequency divider 4 and the read clock generator 5 in the PLL configuration which are used in FIGS. 1 and 2. In FIG. 3, a write clock is generated by a VCO 31 and after dividing the write clock by a 4/3 times frequency divider 32, it is input into a phase comparator 33 and a read clock is input into the phase comparator 33 and the output of the phase comparator 33 is made as a control voltage of the VCO 31. A PLL circuit is thus constructed. Further, a read clock is generated by a PLL circuit which is comprised of a frequency divider 34 to achieve 1820 times a television horizontal synchronizing timing equivalent to the 8 fsc, a comparator 35 and a VCO 36.

In FIG. 4, a write clock is generated from a VCO 41 and after dividing it in a ⅓ times frequency divider 42, the divided write clock is input into a phase comparator 43, and dividing a read clock to ¼ times by ½ times frequency dividers 44, 45, the divided read clocks is input into the phase comparator 43 and the output of the phase comparator 43 is used as a control voltage of the VCO 31. The PLL circuit is thus constructed. Further, the read clock is generated by the PLL circuit which is comprised of ½ times frequency dividers 44, 46 to multiply a television horizontal timing by 1820 equivalent to 8 fsc, a comparator 47 and a VCO 48. The frequency divider to obtain 1820 times is in such a structure that a part or all of the ¼ times frequency divider is applied. A result that is obtained by a circuit in any construction is that a write clock in frequency resulting from multiplying a read clock by ¾ times can be obtained. In the case shown in FIG. 4, any frequency dividing ratio can be easily obtained depending on how a frequency dividing ratio is selected. For instance, if a read clock is divided into four and a write clock into two, 2/4 times division=½ times division, and if a read clock is divided to 1/0 times in frequency and a write clock to ¼ time in frequency, 4/6 times division=⅔ times division are obtained.

In FIG. 2, the converted digital signals are written into the memory 41 based on the write clock. On the other hand, the read clock reads signal data written based on the write clock, which is generated by the clock generator 5, based on the read clock and converts the read digital signal data into analog signals by the DA converter 8. The converted output analog signals are led out from the output terminal 7 as input analog signal data compressed on the ¾ times time-base.

In this embodiment, a digital filter for thinning out the time-base, i.e., for performing the time-base compression is also not needed likewise the embodiment shown in FIG. 1. Further, as the dual port memory 41 is used, the circuit configuration becomes more simple and it is easy to achieve a time-base compression system. As the time-base is compressed by dividing a read clock according to a frequency dividing ratio determined based on the read clock from the memory 41, this embodiment has a feature that the write clock frequency is decreased by a multiple of compression ratio likewise the embodiment shown in FIG. 1. Even when a large compression ratio is used, the read clock does not increase in proportion to a compression ratio but rather the write clock decreases. It is therefore easy to achieve a circuit without constraints of the access speed to the memory 41 and the operational speed of the DA converter 5.

Figure 5:
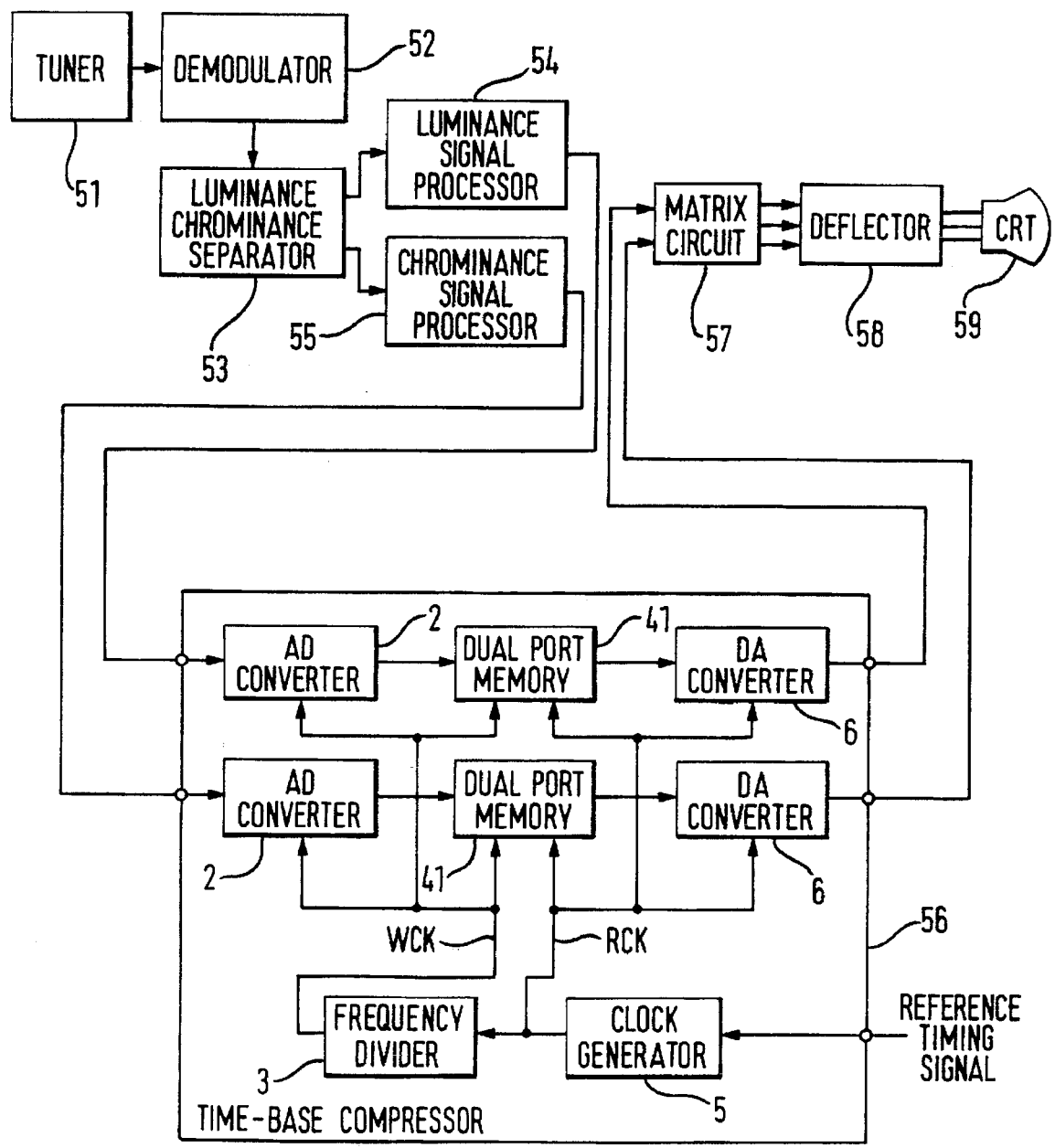
FIG. 5 is a system diagram for explaining an example with the system shown in FIG. 2 applied to a television receiver.

FIG. 5 is a system diagram with the time-base compressor described in FIG. 2 applied to luminance signal and chrominance signal processing systems of a practical television receiver. Further, in this block diagram a voice signal processor was omitted.

Television carrier signals received by a tuner 51 are demodulated by a demodulator 52 and separated into luminance signals and chrominance signals by a luminance signal/chrominance signal separator 53. After the luminance signals and the chrominance signals are processed as baseband video signals in a luminance signal processor 54 and a chrominance signal processor 55, respectively, they are input to a time-base compressor 56. In the time-base compressor 56, the luminance signals and the chrominance signals are processed for the time-base compression independently.

In the time-base compressor 56, the luminance and chrominance signals are multiplied by ¾ so that a 4:3 aspect picture frame can be displayed on a 18:8 aspect screen at a proper aspect ratio. The compressed baseband luminance signals and chrominance signals are converter into RGB signals by a matrix unit 57 and displayed as a picture frame on a CRT 59 via a deflector 58. The picture frame at this time is a picture frame which was compressed by ¾ times in the clockwise direction by the time-base compressor 56. As the width of a 18:9 aspect television receiver is longer than a 4:3 aspect television receiver by 4/3 times, the aspect ratio can be reproduced precisely.

Figure 6:
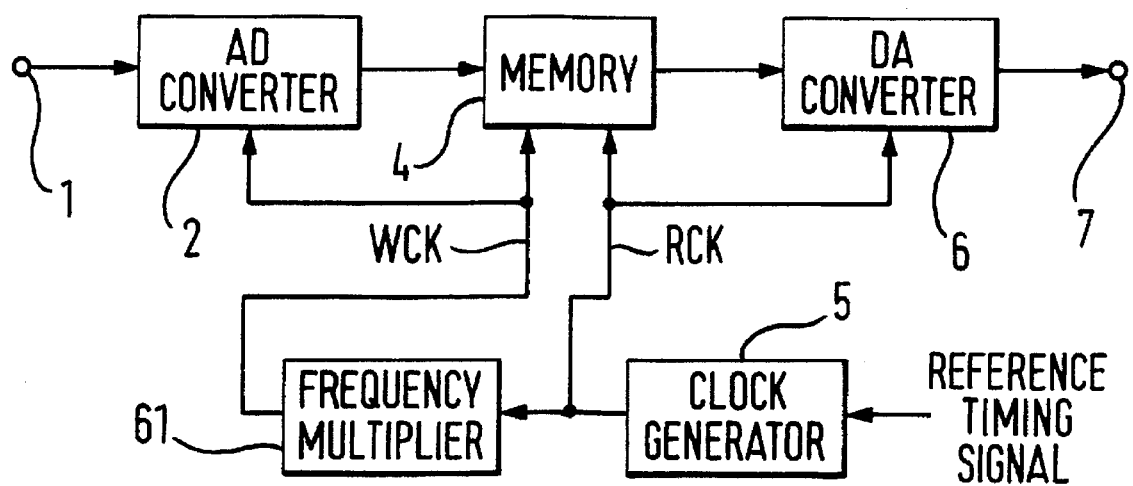
FIG. 6 is a circuit diagram for explaining a second embodiment of the present invention.

Referring now to FIG. 6, a second embodiment of the time-base conversion system according to the present invention will be described. FIG. 6 is a circuit diagram for explaining the second embodiment of the present invention. The circuit of this embodiment is a time-base expander which expands the time-base of input and output signals by making the write clock frequency and the read clock frequency for memories different with each other.

That is, a write clock is generated by multiplying a read clock at an expansion ratio of the time-base by determining a multiplication ratio based on the read clock. In FIG. 6, analog signals input to the input terminal 1 are converted into digital signals having a prescribed sampling period corresponding to the write clock frequency by the AD converter 2. This write clock is generated by multiplying a read clock by 4/3 times at a multiplier 81. This multiplication is carried out using a programmable multiplier. The converted digital signals are written into the memory 4 based on the write clock. On the other hand, the read clock is generated by the clock generator 5. The signal data written based on the write clock are read based on the read clock and the read digital signal data are converted into analog signals by the DA converter 8. The converted output analog signals become data that are obtained by expanding input analog signal data on a 4/3 times time-base.

The expansion of the time-base is thus executed. In this time-base expander, no digital filter is required for the time-base thinning for performing the time-base compression. Therefore, the entire circuit configuration becomes simple and it becomes possible to make the circuit as a time-base conversion system that can be achieved.

Figure 7:
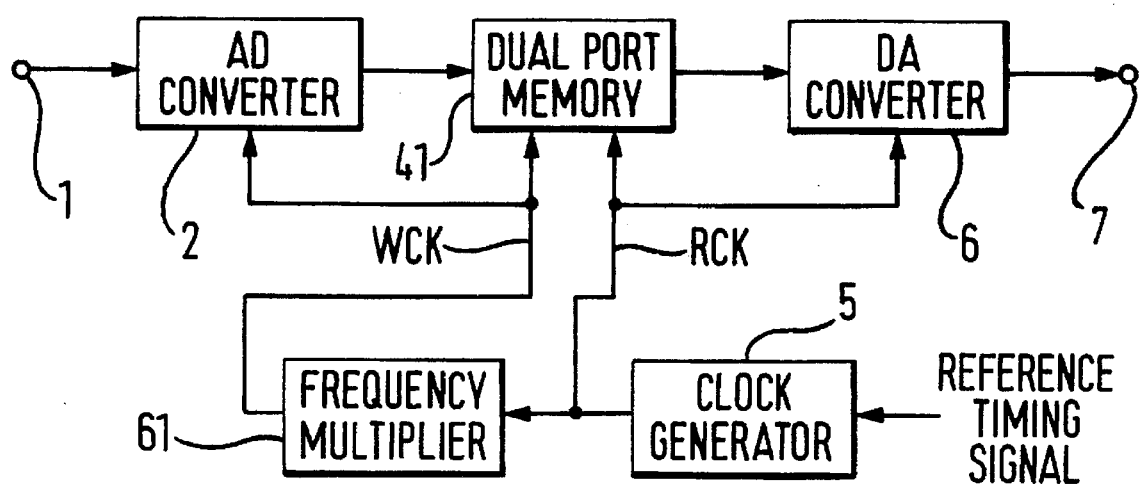
FIG. 7 is a circuit diagram for explaining a third embodiment of the present invention.

Referring now to FIG. 7, a third embodiment of the time-base conversion system according to the present invention will be described. FIG. 7 is a circuit diagram for explaining the third embodiment of the present invention. This embodiment relates to a time-base expander which expands a time-base of input and output signals by differentiating the write clock frequency from the read clock frequency.

The circuit shown in FIG. 7 differs from the second embodiments shown in FIG. 6 in that this circuit uses the dual port type semiconductor memory 41. In this circuit configuration, a time-base expansion ratio is determined by generating a write clock by multiplying a read clock and a time-base expansion ratio is determined based on the read clock.

That is, analog signals input to the input terminal 1 are converted into digital signals having a prescribed sampling period corresponding to the write clock frequency by the AD converter 2. This write clock is generated as a clock resulting from multiplying the read clock by 4/3 times in the multiplier 61. For this multiplier 6, for instance, a PLL circuit is used. The converted digital signals are written into the memory based on the write clock.

On the other hand, a read clock is generated by a clock generator. The signal data written into a memory by the write clock are read and the read digital signal data are converted into analog signals by the DA converter. The converted output analog signals become data that are the input analog signals expanded on a 4/3 times time-base. The time-base expansion is thus executed.

In this embodiment, a digital filter is also not required for the time-base thinning in performing the time-base expansion likewise the embodiment shown in FIG. 6. Further, it is possible to make the circuit configuration more simple as the dual port memory 41 is used.

Figure 8:
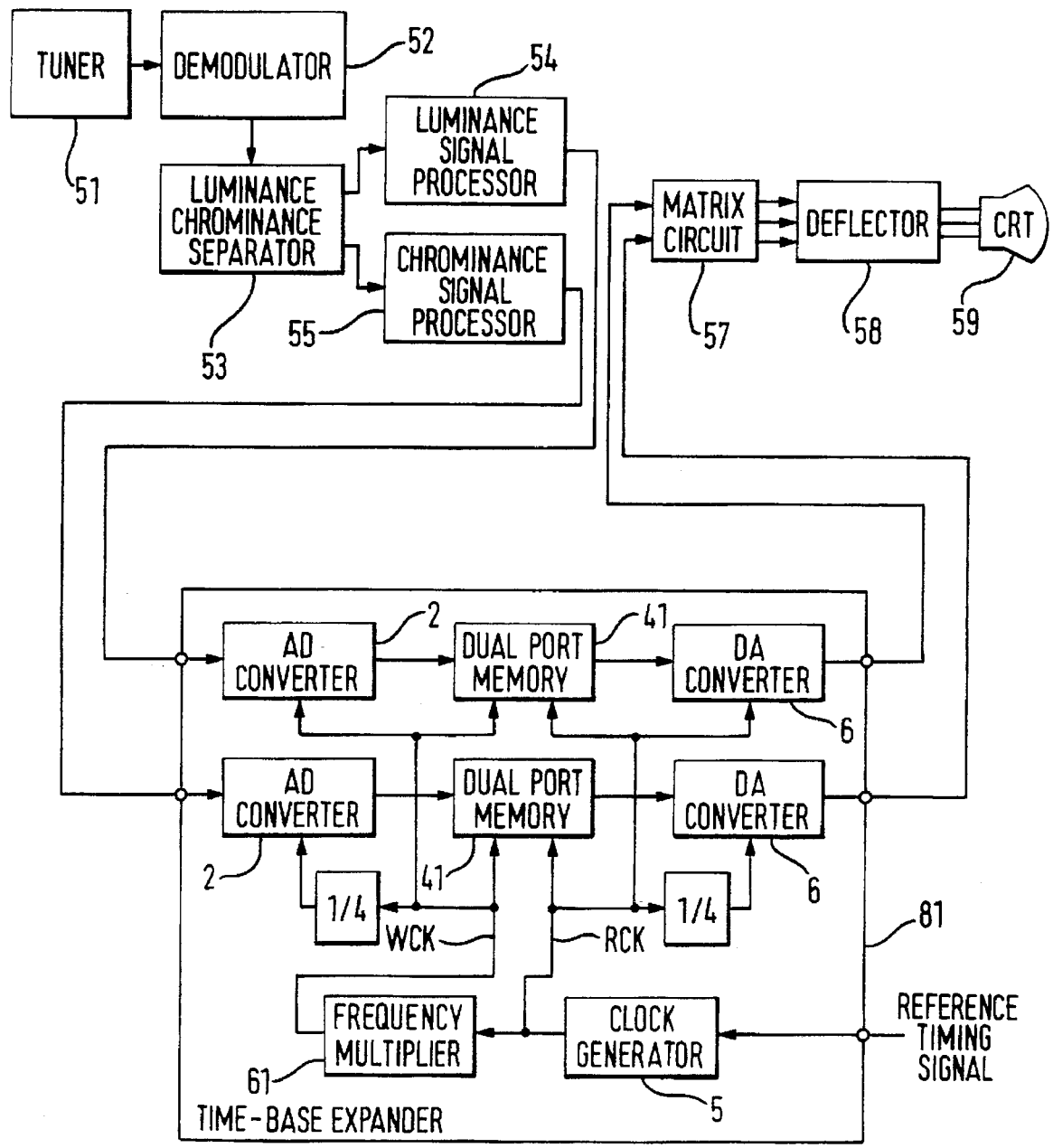
FIG. 8 is a system diagram with the embodiment of the present invention applied to a television receiver.

FIG. 8 shows a system diagram with the time-base expander explained in FIG. 6 applied to luminance signal and chrominance signal processing systems of a practical television receiver, independently. In this block diagram a voice signal processor was omitted.

The television carrier signals receiver by the tuner 51 are separated into luminance signals and chrominance signals by the luminance signal/chrominance signal separator 53 after demodulated by the demodulator 52. The luminance and chrominance signals are processed to baseband video signals by the luminance signal processor 54 and the chrominance signal processor 55, respectively and then input to a time-base expander 81. In the time-base expander 81, the luminance signals and chrominance signals are processed independently for the time-base expansion. In the time-base expander 81, they are multiplied by 4/3 times so that a 16:0 aspect picture frame is displayed on a 4:3 aspect screen at a proper aspect ratio. The expanded baseband luminance signals and the baseband chrominance signals are converted into RGB signals by the matrix unit 57 and displayed as a picture frame on the CRT 59 via the deflector 58. The picture frame at this time is that expanded by 4/3 times in the clockwise direction by the time-base expander 81. The aspect ratio can be reproduced precisely as the width of the screen of a 4:3 aspect television receiver is shorter by 3/4 times than a 10:0 aspect television receiver.

As the read clock and the write clock are generated based on the horizontal synch. signal, the read clock frequency is kept constant and the frequency of a wide aspect conversion system is often set at 8 times of color lock clock (fsc=3.58 MHz) by changing the write clock frequency.

However, in the case of a wide aspect conversion system, a clock that is an integer times of horizontal synch. signal of video signal is normally used as it is necessary to arrange the aspect converted video signal data in the vertical direction. It is therefore necessary to match the clock to the clock system of the entire system in some form. In this case, if the aspect converted clock frequency is widely differing from the clock frequency of the entire system, it becomes very difficult to obtain the matching of the entire system. The color lock clock has been set at 455/2 times of the horizontal synch. signal and it would be 1820 times if 8 times clock of it was used. On a system using 8 times color lock clock, at least aspect conversion clock frequency of a value close to 1820 times must be used by taking the system matching into consideration.

Now, an example for determining a read clock will be introduced. When considering, for instance, a system where an aspect ratio is converter to 3/4 times, 1/2 times and one times an aspect ratios, the chrominance signal band is narrower than luminance signal and operates using a clock frequency with 1/4 times that of the luminance signal to reduce a circuit scale.

The read clock is set at 1824 times the horizontal synch. signal (1824 fH). In this case, it is possible to achieve the 3/4 compression when multiplying the write clock frequency by 3/4 times (1368 fH: luminance signal) and the 1/2 times compression when multiplying the write clock frequency by 1/2 times (812 fH: luminance signal). In the case of the chrominance signal, the compression can be achieved by 1/4 times the clock frequency. These relationships are summarized in Table 1.

TABLE 1

Picture Mode and Sampling Rate (at 1824 fH)

| Picture | Luminance | | Chrominance | |
|---|---|---|---|---|
| Mode | Write Rate | Read Rate | Write Rate | Read Rate |
| Standard Mode | 1358 fH | 1824 fH | 342 fH | 456 fH |
| ½ Mode | 912 fH | 1824 fH | 228 fH | 456 fH |
| Through Mode | 1824 fH | 1824 fH | 456 fH | 456 fH |

As seen in Table 1, if the read clock frequency is set at 1824 times, clock frequencies corresponding to the picture modes become always integer multiple of the horizontal synch. signal and there exists no inversion clock between lines. In the case of 1820 times the read clock frequency, it becomes 455/2 times at the ⅛ TIMES compression and the clock is inverted between the lines. Examples of the read clock frequency multiplied by 1808 times are shown in Table 2.

TABLE 2

Picture Modes and Sampling Rates (at 1808 fH)

| Picture | Luminance | | Chrominance | |
|---|---|---|---|---|
| Mode | Write Rate | Read Rate | Write Rate | Read Rate |
| Standard Mode | 1356 fH | 1808 fH | 339 fH | 452 fH |
| ½ Mode | 904 fH | 1808 fH | 226 fH | 452 fH |
| Through Mode | 1808 fH | 1808 fH | 452 fH | 452 fH |

The fourth embodiment of the present invention in which an aspect conversion system with the ¾ times compression, the ½ times compression and no compression will be explained referring to the circuit diagram shown in FIG. 9. Here, the read clock frequency is assumed to be, for instance, 30 MHz. In this case, it is possible to achieve the ¾ times compression when the write clock frequency is 22.5 MHz (¾ times of 80 MHz), the ½ times compression when the write clock frequency is 15 MHz (½ times of 30 MHz), and no compression when the write clock frequency is 30 MHz.

Figure 9:
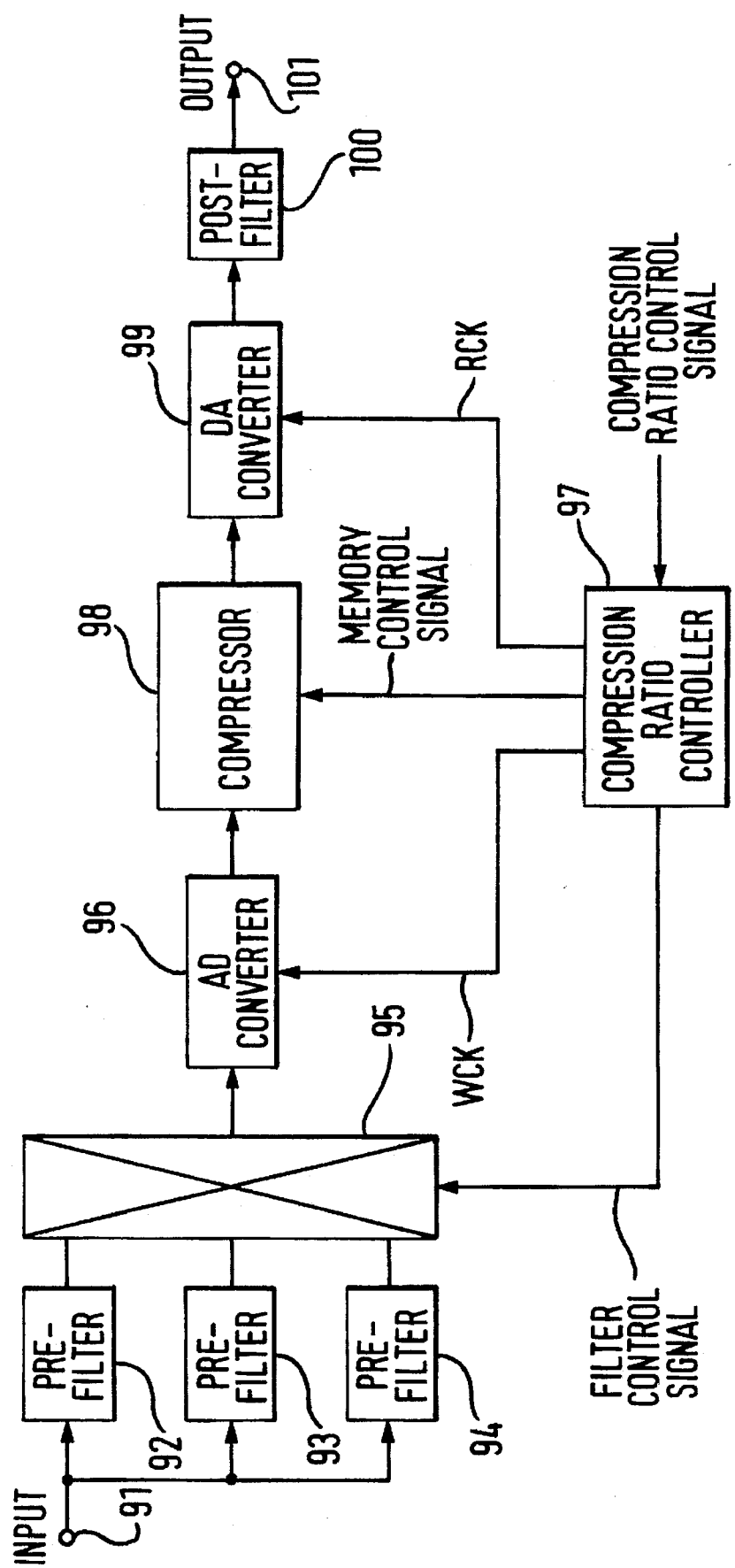
FIG. 9 is a circuit diagram for explaining a fourth embodiment of the present invention.

In FIG. 9, analog video signals before the aspect conversion are input through an input terminal 91. The input analog video signals are input to pre-filters 92 through 94 that are composed of an analog circuit. The outputs of the pre-filters 92 through 94 are input to a selector 95. The output of the selector 95 is input to an A/D converter 96. The A/D converter 96 converts the input analog video signals into digital signals based on the write clock supplied from a compression ratio controller 97. The video signals are input to a compressor 98, after being converted into digital signals by AD converter 96. The compressor 98 is composed of a memory and the like. It writes data in the memory based on the write clock and reads data from the memory by the read clock supplied from the compression ratio controller 97. The aspect converts digital video signals based on the read clock are input to a D/A converter 99. The D/A converter 99 reads the digital video signals based on the read clock supplied from the compression ratio controller 97 and converts them into analog video signals. The video signals converter into the analog video signals are input to a aliasing error removing post filter 100. The video signals with the aliasing error removed by the post filter 100 are aspect converted and output from an output terminal 101.

A compression ratio control signal is input to the compression ratio controller 97. This compression ratio control signal is comprised of, for instance, 2 bits and will be "00" for the ¾ times compression, "01" for the ½ times compression and "10" for no compression. The compression ratio controller 97 generates a write clock, read clock and filter control signal according to this compression ratio control signal. At the ¾ times compression, a write clock of 22.5 MHz frequency and a read clock of 30 MHz frequency are generated.

Now, the functions of the pre-filters 92 through 94 are to remove aliasing error. As in the Nyquist theorem, the frequency band of the pre-filters 92 through 94 must be below the write clock. As described above, in this embodiment the write clock frequency differs according to the compression modes. Therefore, if this proposal is not used, all modes must be adapted to the most low frequency mode to remove the aliasing error. In this embodiment, all the pre-filters 92 through 94 in the frequency band below 7.5 MHz, which is a half of the write clock frequency 15 MHz for the ½ times compression mode, are to be used in all modes. It is therefore meaningless that high frequencies are used specially to promote the resolution.

Figure 10:
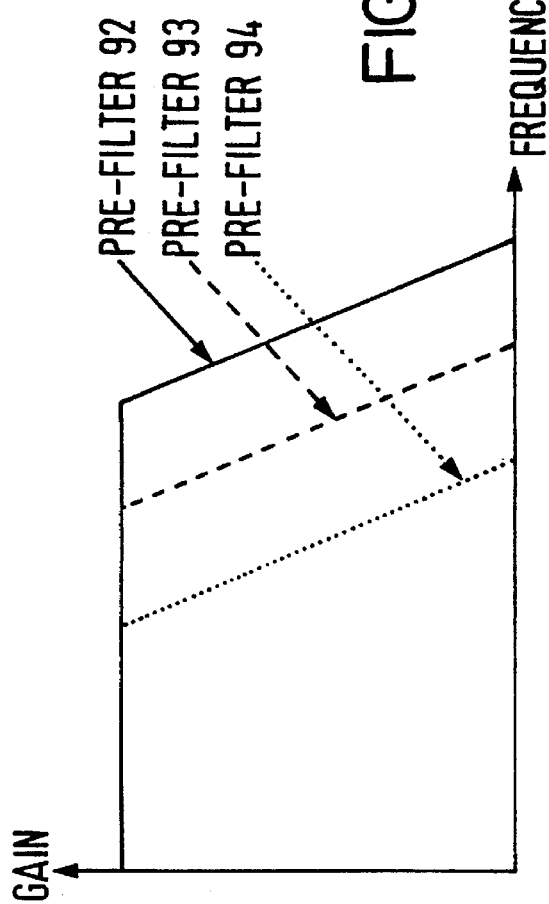
FIG. 10 is a characteristic diagram for explaining characteristics of pre-filters used in FIG. 9.

In this embodiment, a pre-filter in the frequency band adapted to the applicable write frequency is selected by a filter control signal that is output from the compression ratio controller 97. The characteristics of the pre-filters 92 through 94 having different frequency characteristics are shown in FIG. 10.

Figure 11:
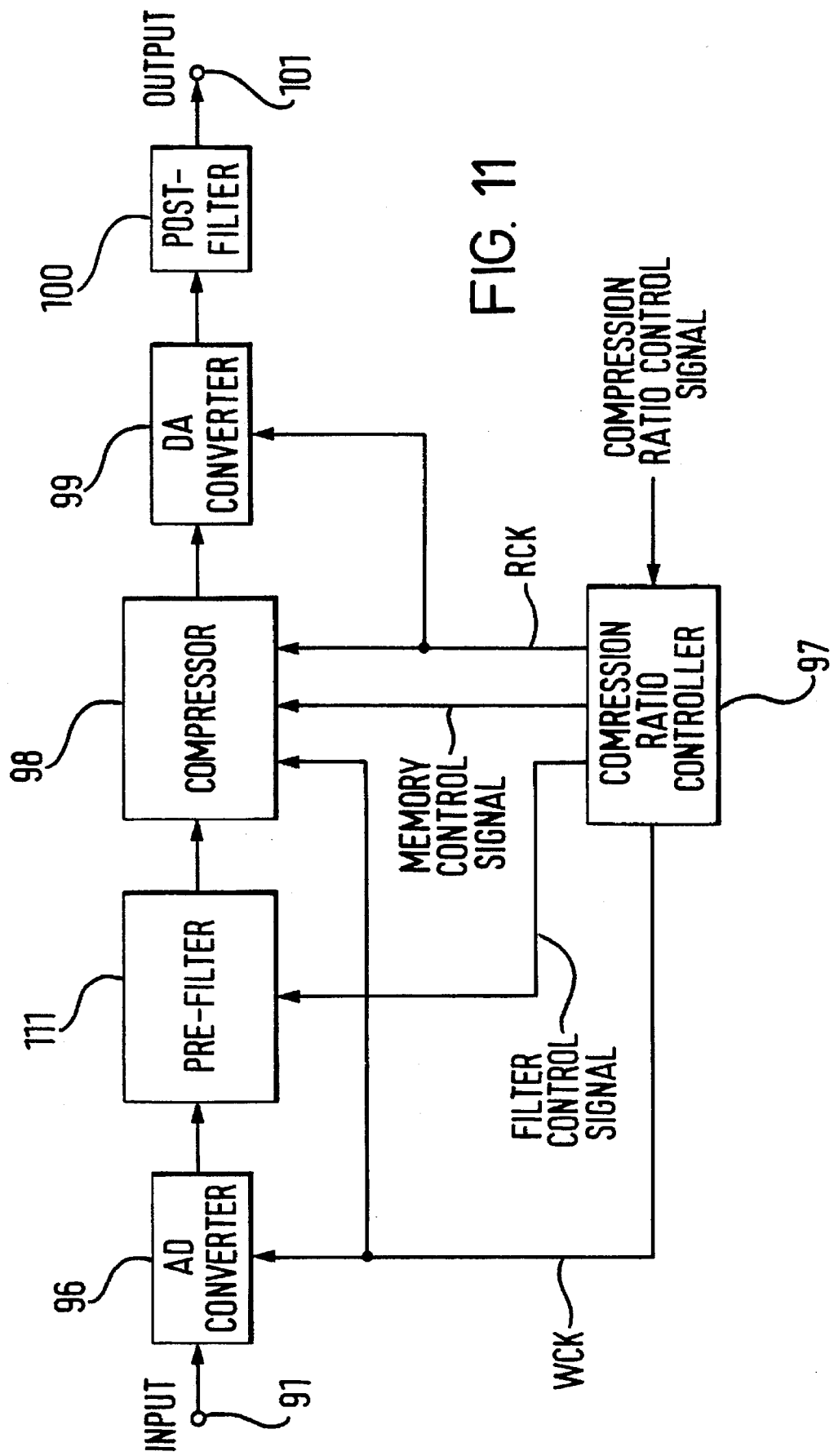
FIG. 11 is a circuit diagram with the pre-filters in the embodiment shown in FIG. 9 digitized.

In this embodiment, the pre-filters 92 through 94 are constructed in an analog circuit but they can be constructed in a digital circuit to make the system as a full digital system. FIG. 11 shows the system with the pre-filters constructed in the digital circuit.

The construction of this embodiment differs from that shown in FIG. 9 in that the pre-filters 92 through 94 and the selector 95 were eliminated and a pre-filter 111 has been connected between the A/D converter 96 and the compressor 98 for filtering digital signals.

Figure 12:
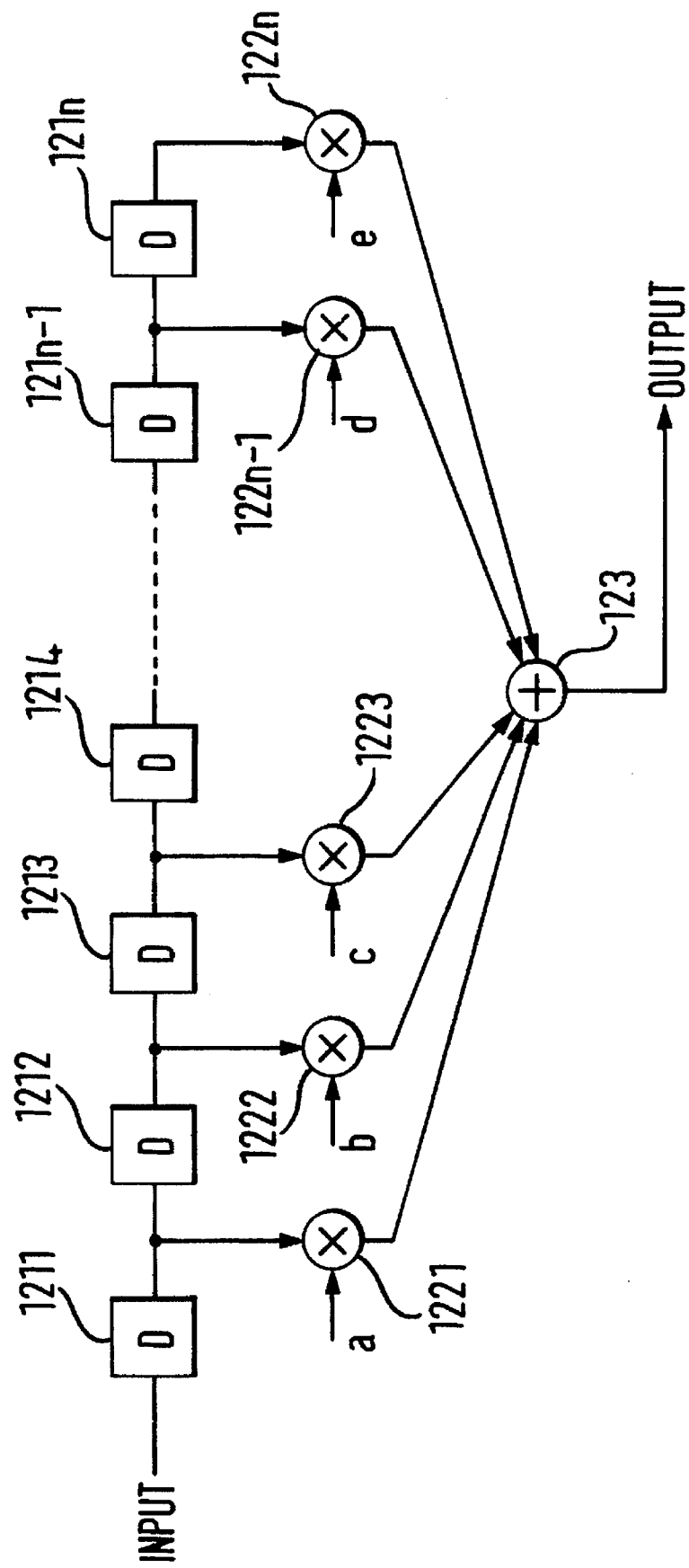
FIG. 12 is a circuit diagram for explaining an FIR filter used in the present invention.

An FIR type filter as shown in FIG. 12 is generally used for the digital filter. In FIG. 12, reference numerals 121l through 121n denote delay circuits, reference numerals 1221 through 122n denote multipliers and reference numerals 123 denotes an adder. The construction and operation of the FIR type filter are for the basic digital signal processing but the detailed operation will be omitted. Here, for using an FIR type filter as a frequency response variable pre-filter 111 shown in FIG. 11, it can be achieved in the same construction only while changing a coefficient "a" that is being applied to the multiplier 1221.

Hereinafter, the VCO that is used in the present invention will be explained in more detail referring to FIG. 13 and a timing chart shown in FIG. 14. The horizontal synch. signal HDI that is the base of this VCO timing is input to a ½ times divider 131 through the input terminal. The horizontal synch. signal HDI is divided by 2 in the ½ times divider 131 and converted into a signal with a duty 50%. The input signal converted to the 50% duty signal is input to a phase comparator 132. The phase comparator 132 compares the phases of the halved signal with the feed back HREF signal. After the phase comparison, an error signal is input to a VCO of the center frequency 1824 fH (fH is the frequency of the horizontal synch. signal). The 1824 fH output from the VCO 133 is used as a read clock. Further, the 1824 fH is input to a ¼ times divider 134 and is turned to 456 fH. The 456 fH that is the output of the ¼ times divider 134 is input to a 456 times divider 135 where it is divided into the same frequency fH as the horizontal synch. signal HDI. This divided frequency becomes the HREF signal that is used as the internal horizontal synchronizing reference signal. The HREF signal is further divided into the 50% duty signals by a the ½ times divider 136 and input to the phase comparator 132 and compared with the halved signal of the horizontal synch. signal HDI described above.

Further, the 456 fH which is the output of the ¼ times divider 134 is further input to a ½ times divider 137 where 228 fH of duty 50% is generated. This signal is input to a phase comparator 138. The phase comparator 138 compares this input signal with the output of a 1/6 times divider 139 and outputs an error signal. The output of the phase comparator 138 is input to a VCO 140 where the center frequency will become 1368 fH. The frequency of 1368 fH which is output from the VCO 140 is used as the write clock is this embodiment. Further, the frequency of 1368 fH is divided to 1/6 times in frequency in the ⅛ times divider 139, i.e., the frequency of 228 fH, and its phase is compared in the phase comparator 138.

Figure 14:
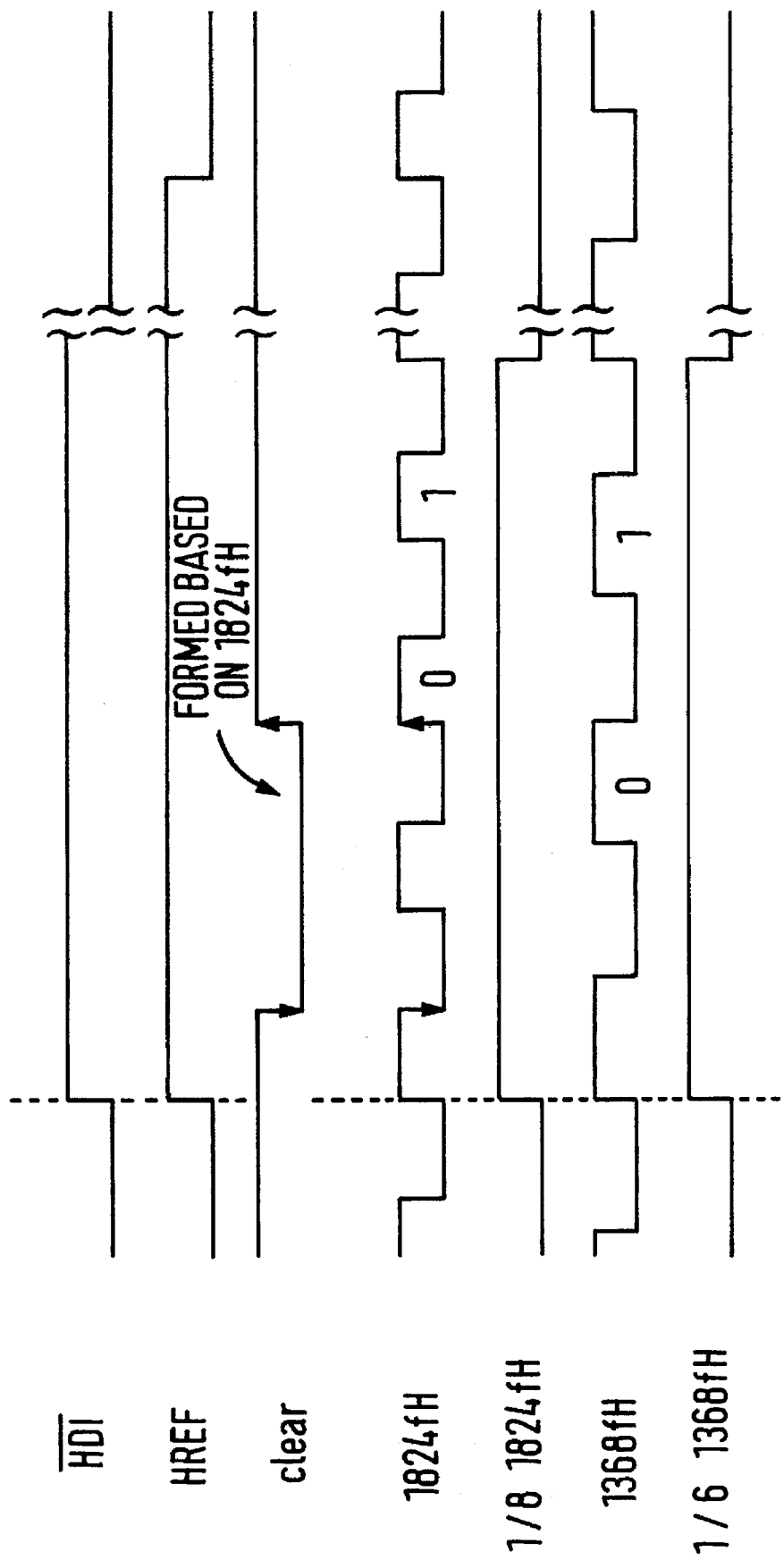
FIG. 14 is a timing chart for explaining the operation of the VCO shown in FIG. 13.

By constructing the PLL as described above, signals are obtained at the timing shown in FIG. 14. For instance, in the wide aspect conversion, the system must be operated based on the HREF signal which is in conformity with the horizontal synch. frequency. Therefore, a clear signal is generated using the 1824 fH which is the read clock in this embodiment. In the VCO system shown in the embodiment, the PLL is constructed based on this 1824 fH but it is expected that the 1824 fH read clock and the 1868 fH write clock generate about 10 ns jitter depending on such external conditions as fluctuation of analog devices, temperature change and the like. As a result, there were such malfunctions generated as subtle clock phases shift, generation of one clock shift, generation of one clock jitter, resulting in notching the vertical lines and the like.

Figure 13:
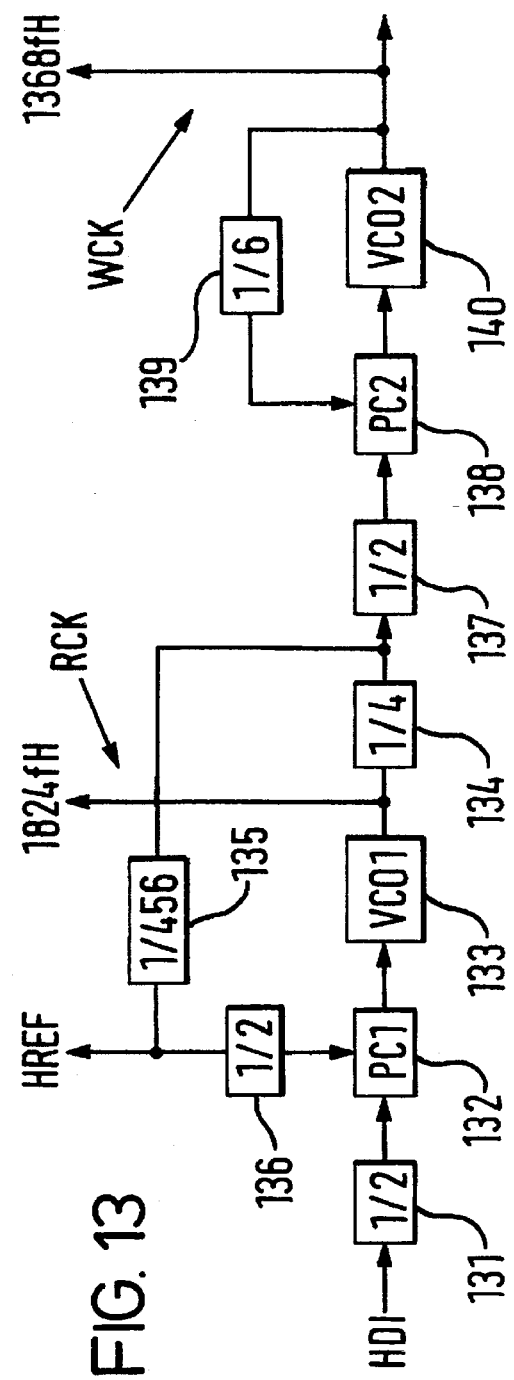
FIG. 13 is a block diagram for achieving a VCO used in the embodiment of the present invention.
Figure 15:
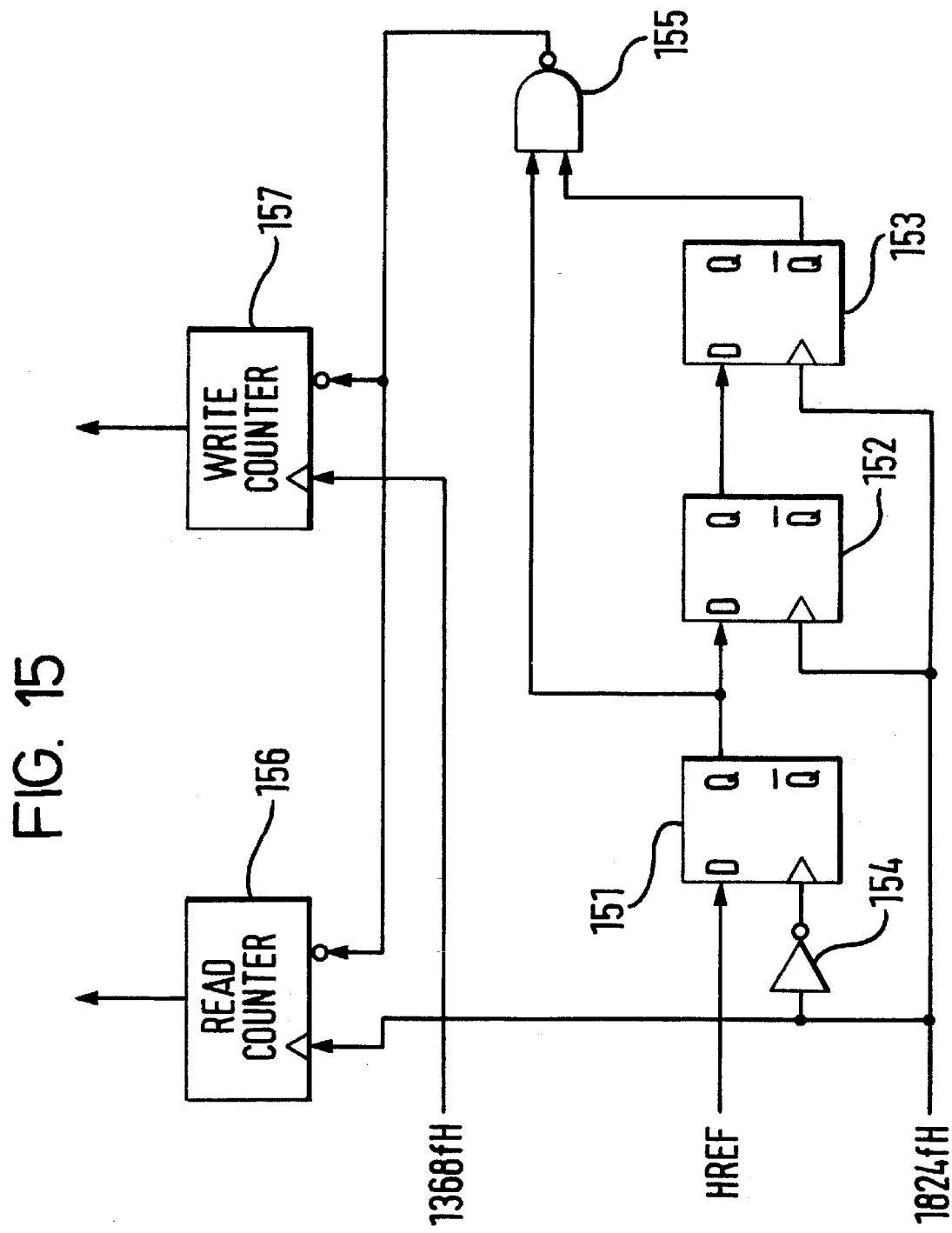
FIG. 15 is a circuit diagram for explaining means for solving malfunctions in the embodiment shown in FIG. 13.

FIG. 15 shows means for solving the malfunctions involved in the embodiment shown in FIG. 13 by simultaneously clearing the read counter 156 or generating the read timing and the write counter 157 for generating the write timing. Hereinafter, FIG. 15 will be explained by comparing it with FIG. 14.

The clear timing shown in FIG. 14 is generated based on the HREF signal by the read clock 1824 fH using flip-flops 151 through 153, an inverter 154 and an NAND gate 155. The clear signal is generated by 1824 fH but this clearing signal also must clear circuits generated by 1368 fH. In the aspect conversion system shown in the embodiment, a clearing circuit used in counters uses a sync clearing system synchronizing with the leading edge of a clock in order to synchronize with the clock. At least more than one leading edge of 1368 fH must be contained in the clearing section of the clearing signal so that the clearing position does not move even when a clock jitter equivalent to 10 ns is generated. In this example of the clearing signal generation, it has been so set that the leading edge of the frequency of 1368 fH becomes one even when there are certain jitters as the clearing section contains the leading edge of 0 pulse of 1368 fh, and furthermore the clearing signals are generated at the trailing edge and the leading edge of the frequency of 1824 fH.

In FIG. 15, as the clearing signal is input to the read counter 156 and the write counter 157 and both counters are cleared simultaneously for every horizontal period, there is no deviation between the read and the write and a wide aspect system can be achieved without generating one clock jitter.

Figure 16:
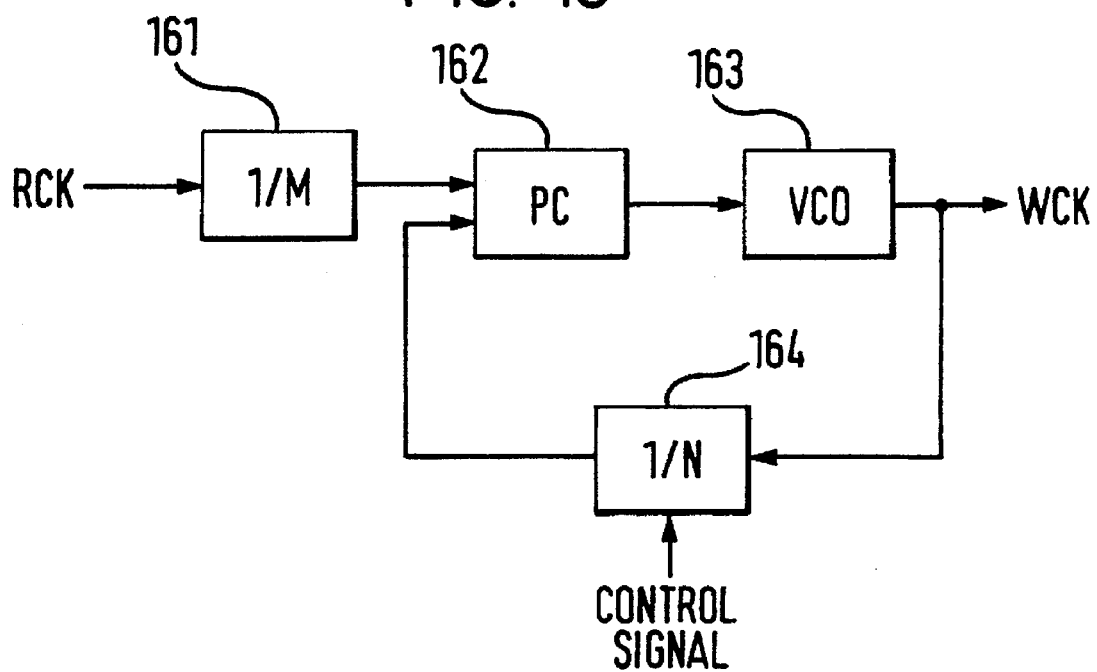
FIG. 16 is a block diagram for explaining a fifth embodiment of the present invention.

FIG. 16 is for explaining the fifth embodiment of the present invention. First, generation of compression clocks will be described. For convenience of explanation, it is assumed as M=16. RCK, a read clock, is input to a 1/16 times divider 161 and divided into 1/16 times in frequency. The 1/16 times frequency division signal is input to a phase comparator 162 and is compared with the phase of a signal input through another input terminal. The phase error signal generated after the phase comparison is input to a VCO 162. The output clock of the VCO 163 becomes a write clock WCK. The output of the VCO 163 serves as a clock signal, and at the same time be input to a variable divider 164. This variable divider 164 controls a dividing ratio by an external control signal, i.e., a control signal supplied from the outside. The write clock WCK is variably divided by the variable divider 164 and input to another input terminal of the phase comparator 162.

Now, it is assumed that the frequency of the read clock RCK is 30 MHz and N=8. In this case, as the PLL is constructed to make two input frequencies of the phase comparator 162 equal to each other, the output signal frequency of the variable divider 164 becomes 30/18 MHz. The write clock WCK becomes 30/2 MHz and the ½ times compression aspect conversion is achieved. Similarly, when N=12, the ¾ times compression can be achieved.

Figure 17:
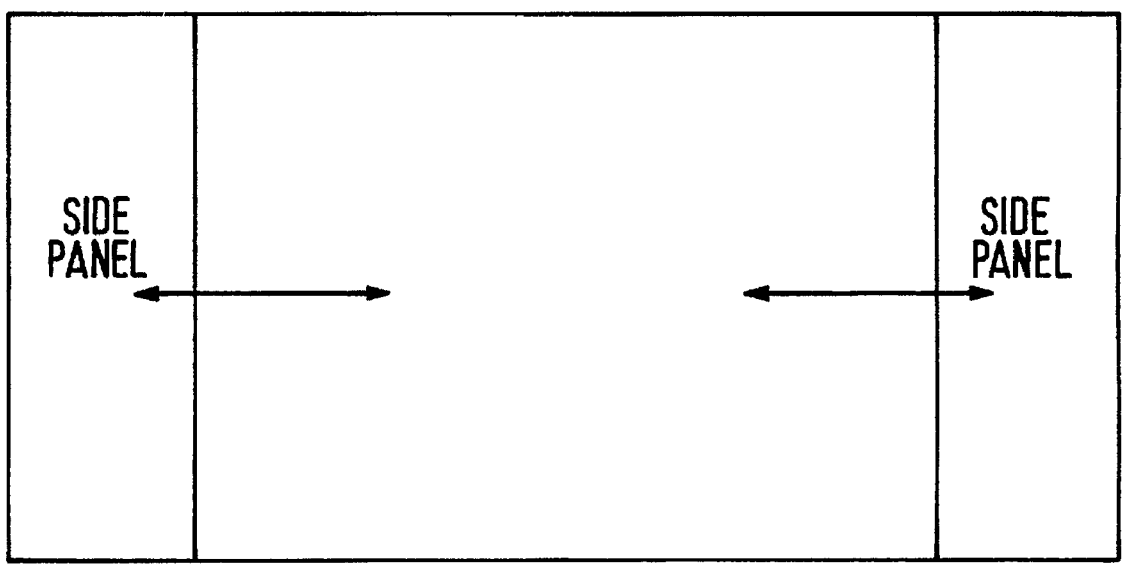
FIG. 17 is an explanatory diagram for explaining images displayed on a television screen achieved by the present invention.

For instance, when the variable divider is set at ⅛ times through 1/16 times division, the aspect ratio can be varied from the ½ times compression to the 0 times compression. In this case, if N is an integer 8, 8, ... 16, a control signal can be controlled by a 3-bit digital signal. Further, even when a control signal and a variable divider are constructed in an analog circuit and variable steps are varied analogically, a picture without the feeling of disorder is realized in the changeover portion even when an aspect ratio is changed in a line. Further, even when an aspect ratio is changed digitally step by step in a line, a picture without the feeling of disorder can be obtained if a follow-up time constant of the VCO is set somewhat longer. FIG. 17 is a schematic diagram showing a picture when an aspect ratio of the wide television screen is varied.

Next, the time-base expansion will be described. In the case of expansion, it is assumed that M is 8 and the read clock RCK is 10 MHz. In this case, if N is, for instance, 16, the write clock WCK=20 MHz is obtained as explained above. When N is changed from 8 to 16, the write clock WCK frequency of 1 times through 2 times the read clock RCK is obtained.

Figure 18:
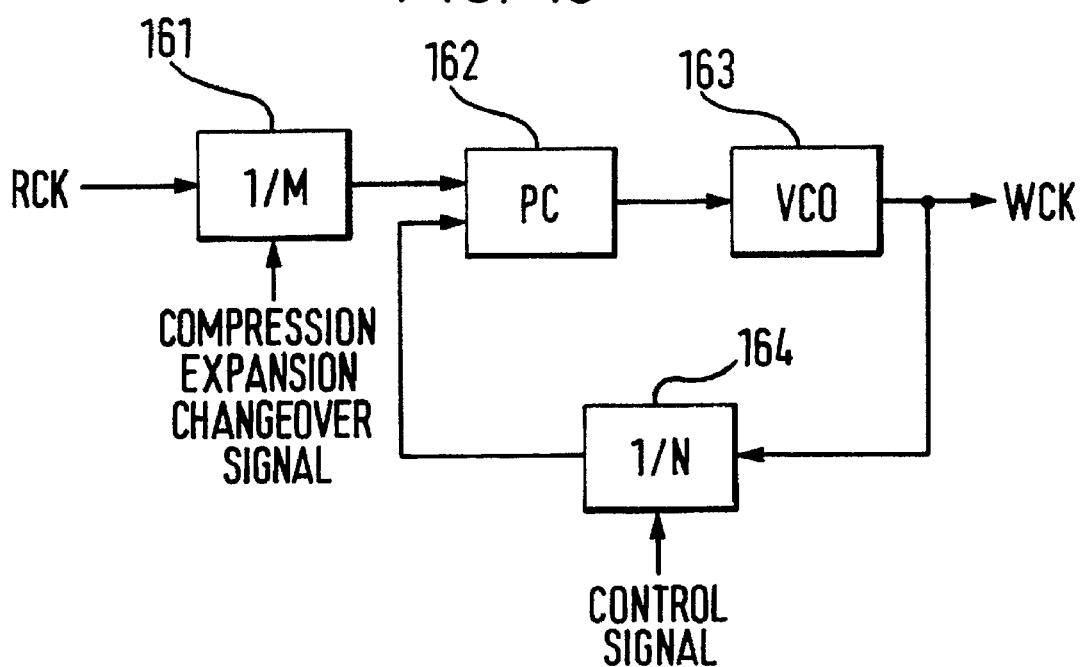
FIG. 18 is a block diagram for explaining a modification of the embodiment shown in FIG. 16.
Figure 19:
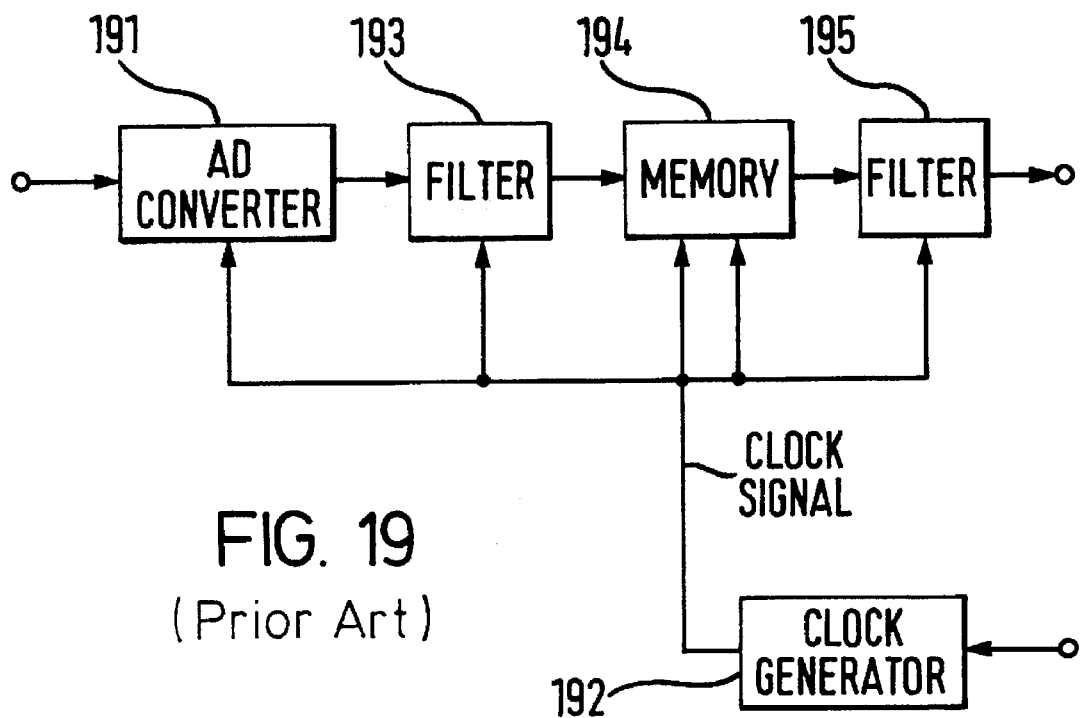
FIG. 19 is a block diagram for explaining the time-base compressor of a conventional television receiver.
Figure 20:
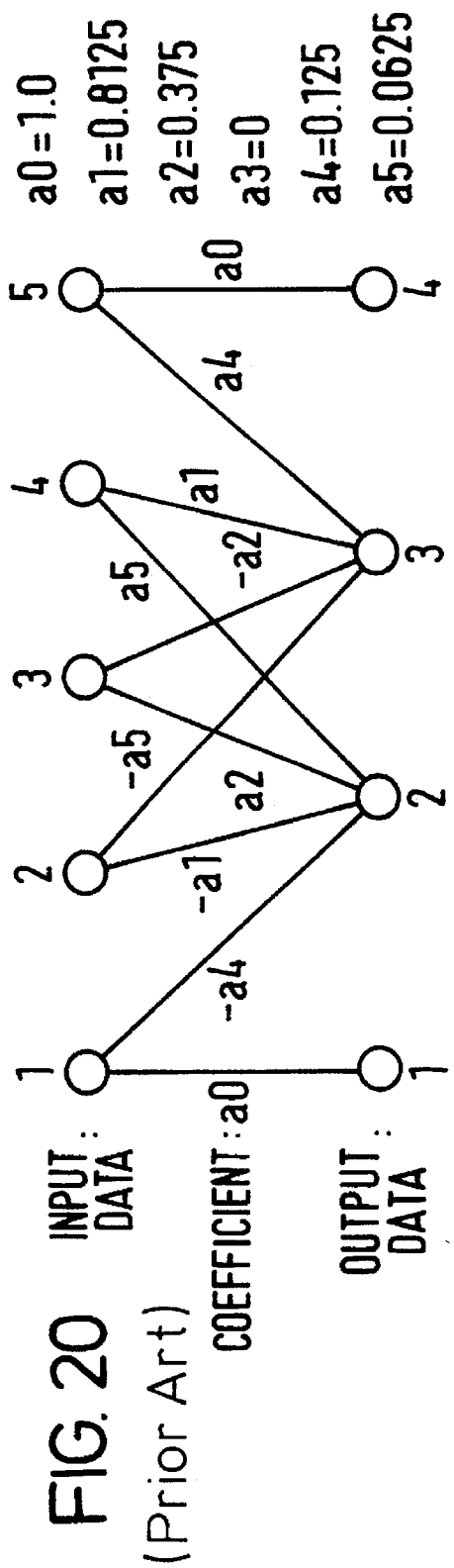
FIG. 20 is an explanatory diagram for explaining the principle of operation of a conventional thinning filter.
Figure 21:
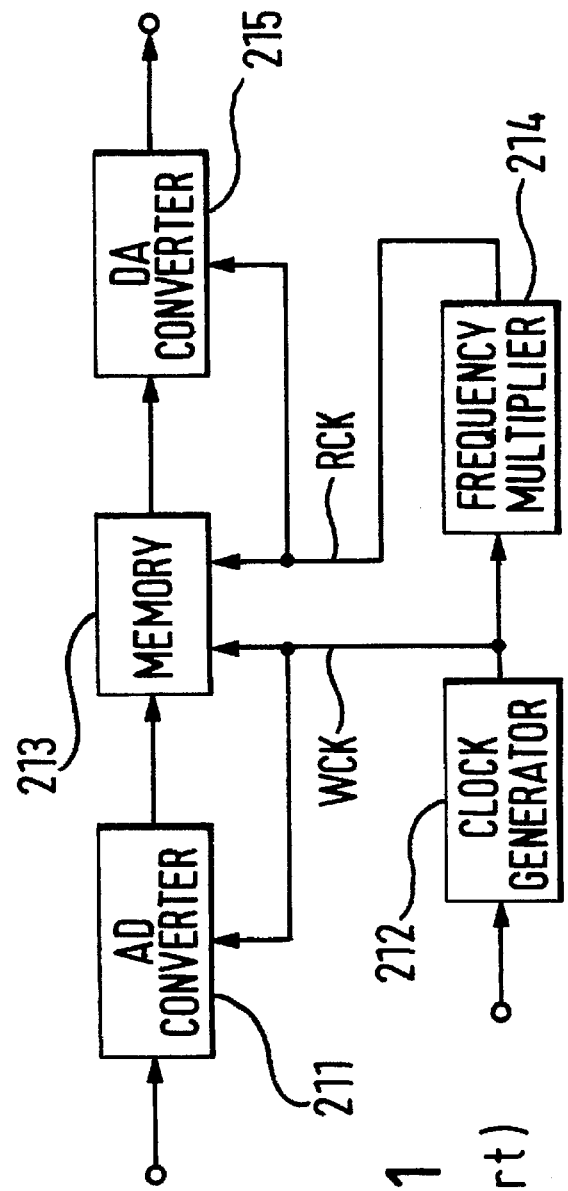
FIG. 21 is a block diagram for explaining the time-base compressor of a conventional television receiver.

Further, when a compression/expansion selecting signal is applied to a variable divider 181, it is possible to achieve, for instance, ½ times through 2 times variable division and expanders in simple construction as shown in FIG. 18.

As described above, the present invention can provide an extremely preferable time-base conversion system which is capable of compressing the time-base by varying write clock based on memory read clock, making a circuit scale small, keeping read clock frequency constant even when using a large compression ratio, thus achieving a large compression ratio easily and selecting optimum pre-filters in varied compression modes, it is possible to obtain extremely satisfactory high resolution video signals and satisfactory reproduced pictures without single clock jitter even when the system uses different read and write clock frequencies.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A time-base conversion system for an aspect ratio conversion system that is based on an input video signal, the time-base conversion system comprising:

a first convertor for converting an analog video signal into a digital video signal, a clock for generating a read clock signal and a write clock signal based on a horizontal synchronizing signal, a frequency of the read clock remaining constant, a second convertor for converting an aspect ratio of the digital video signal from an existing aspect ratio to a desired aspect ratio by changing a frequency of the write clock signal, at least one aliasing error removing filter having multiple frequency characteristics for removing error related to aliasing error introduced by the first convertor during the conversion of the analog video signal into the digital video signal, and a filter frequency characteristic selecting device for selecting an optimum frequency characteristic of the at least one aliasing error removing filter, the optimum frequency characteristic being selected based on the desired aspect ratio.

2. A time-base conversion system as claimed in claim 1, wherein each of the at least one aliasing error removing filters and the filter selecting device are comprised of an analog circuit, the filter selecting device being a filter switching device.

3. A time-base conversion system as claimed in claim 1, wherein each of the at least one aliasing error removing filters and the filter selecting device are comprised of a digital circuit, the filter selecting device being a filter switching device.

4. A time-base conversion system for an aspect ratio conversion system that is based on an input video signal, the time-based conversion system comprising:

a first convertor for converting an analog video signal into a digital video signal, a clock for generating a read clock signal and a write clock signal based on a horizontal synchronizing signal, the frequency of the read clock remaining constant, a frequency of the write clock signal being based on a desired aspect ratio, a second convertor for converting an aspect ratio of the digital video signal from an existing aspect ratio to the desired aspect ratio based on a frequency of the write clock signal, at least one aliasing error removing filter having multiple frequency characteristics for removing error related to aliasing error introduced by the first convertor during the conversion of the analog video signal into the digital video signal, and a filter frequency characteristic selecting device for selecting an optimum frequency characteristic generated by the at least one aliasing error removing filter, the optimum frequency characteristic being selected based on the desired aspect ratio.

5. A time-base conversion system as claimed in claim 4, wherein each of the at least one aliasing error removing filters and the filter selecting device are comprised of an analog circuit, the filter selecting device being a filter switching device.

6. A time-base conversion system as claimed in claim 4, wherein each of the at least one aliasing error removing filters and the filter selecting device are comprised of a digital circuit, the filter selecting device being a filter switching device.

7. A method of performing time-base conversion based on an input video signal, the method comprising the steps of:

converting an analog video signal into a digital video signal, generating a read clock signal and a write clock signal based on a horizontal synchronizing signal, a frequency of the read clock remaining constant, converting an aspect ratio of the digital video signal from an existing aspect ratio to a desired aspect ratio by changing a frequency of the write clock signal, removing error related to aliasing error introduced during the conversion of the analog video signal into the digital video signal, and selecting an optimum frequency characteristic used for removing the error related to aliasing error, the optimal frequency characteristic being selected based on the desired aspect ratio.

8. A method for performing time-base conversion based on an input video signal, the method comprising the steps of:

converting an analog video signal into a digital video signal, generating a read clock signal and a write clock signal based on a horizontal synchronizing signal, the frequency of the read clock remaining constant, a frequency of the write clock signal being based on a desired aspect ratio, converting an aspect ratio of the digital video signal from an existing aspect ratio to the desired aspect ratio based on a frequency of the write clock signal, removing error related to aliasing error introduced during the conversion of the analog video signal into the digital video signal, and selecting an optimum frequency characteristic used for removing the error related to aliasing error, the optimum frequency characteristic being selected based on the desired aspect ratio.

* * * * *